United States Patent [19]

Saeki et al.

[11] Patent Number: 4,870,154

[45] Date of Patent: Sep. 26, 1989

[54] METHOD OF PRODUCING A QUICK-CURING NOVOLAC PHENOLIC RESIN USING AMMONIUM HALIDES

[75] Inventors: Yukio Saeki; Toshiaki Nishimura; Kozuichi Ikeda, all of Fujieda, Japan

[73] Assignee: Sumitomo Durez Company, Ltd., Tokyo, Japan

[21] Appl. No.: 123,514

[22] Filed: Nov. 20, 1987

[30] Foreign Application Priority Data

Nov. 25, 1986 [JP] Japan .................................. 61-278657

[51] Int. Cl.$^4$ ...................... C08G 61/10; C08G 61/14; C08G 67/06; C08G 69/00
[52] U.S. Cl. .................................... 528/145; 528/146; 525/504
[58] Field of Search ................. 528/145, 146; 525/504

[56] References Cited

U.S. PATENT DOCUMENTS

| | | | |
|---|---|---|---|
| 2,636,017 | 4/1953 | Schwartzberg | 528/146 |
| 3,619,342 | 11/1971 | Burke | 528/146 |
| 4,433,119 | 2/1984 | Brode et al. | 528/139 |

FOREIGN PATENT DOCUMENTS 739161  2/1970  Belgium ............................ 528/146

*Primary Examiner*—John Kight
*Assistant Examiner*—Carlos Azpuru
*Attorney, Agent, or Firm*—James F. Tao; James F. Mudd

[57] ABSTRACT

A method of producing a novolac phenolic resin having quick-curing properties and good fluidity is disclosed, whereby the novolac resin is prepared by reacting a phenol with an aldehyde using an acidic catalyst and thereafter adding an ammonium halide. The ammonium halide is added in amounts of about 0.05 to 3 wt % of the solid resin, and the conversion of aldehyde is not less than 90% and the water content of the resin is not less than 5%.

10 Claims, No Drawings

METHOD OF PRODUCING A QUICK-CURING NOVOLAC PHENOLIC RESIN USING AMMONIUM HALIDES

BACKGROUND OF THE INVENTION

The present invention relates to a procedure for the preparation of a novolac type phenolic resin that is quick-curing and has high fluidity. It can be utilized as a binder for various types of organic or inorganic materials.

Novolac type phenolic resins are generally prepared by reacting a phenol and an aldehyde in the presence of an acidic catalyst. Usually, a phenol and an aldehyde are placed in a reaction vessel with an acidic catalyst and reflux for a period of time, followed by dehydration under reduced pressure to produce a resin. Hexamine is a preferred agent for curing the resin, and after mixing and forming, heat is applied to form an insoluble and non-fusible cured resin.

When a comparatively strong acid substance such as oxalic acid, hydrochloric acid, para-toluenesulfonic acid, phosphoric acid or the like is used as a reaction catalyst for a novolac type phenol resin, the novolac type phenol resin obtained has a combination form generally called random novolac or high-para-novolac due to a low ortho/para ratio. Although the durability of this cured resin is excellent, it has disadvantages in that the curing rate by heating is low.

As a method of improving the curing rate of a novolac type phenol resin, there is known a method of using a metal salt of an organic acid such as zinc acetate, magnesium acetate and calcium acetate as a reaction catalyst for the synthesis of a resin, thereby obtaining a resin having a high ortho/para ratio and generally called a high ortho-novolac. Although this method brings about a quick curing property, it has the disadvantage in that since the fluidity of the resin during curing is low, the strength of the cured resin is inferior.

A method of adding an aromatic carboxylic acid such as salicylic acid and benzoic acid to a resin during or after synthesis of a resin has been generally used. This has the effects of accelerating curing, lowering of the melting point and increasing the fluidity of the resin.

Therefore, it is an object of this invention to obtain a novolac type phenolic resin that possesses the rapid cure cycle so desire, and high fluidity for easy incorporation in a formulation.

SUMMARY OF THE INVENTION

This invention is concerned with the method of preparation of a novolac type phenolic resin possessing high fluidity and rapid curing properties. It has been found that it is possible to obtain properties by the method of reacting a phenol with an aldehyde in the presence of an acidic catalyst followed by the addition of a halogenated ammonium salt in an amount of 0.05 to 3.0 wt % based on the resin solid content in which the conversion of the aldehyde is not less than 90 wt % and the water content is not less than 5 wt % water.

DETAILED DESCRIPTION OF THE INVENTION

As the phenol in the present invention, phenol, ortho-cresol, meta-cresol, para-cresol, xylenol, bisphenol A, resorcin, hydroquinone, etc. are usable. As the aldehyde, formalin and an aldehyde which is substantially the source of generating formaldehyde, for example, para-formaldehyde and trioxane are used. As the reaction catalyst, a comparatively strong acid substance such as oxalic acid, hydrochloric acid, paratoluenesulfonic acid, and phosphoric acid is preferably used.

As the halogenated ammonium salt, ammonium chloride and ammonium bromide are preferable. The halogenated ammonium salt is added during the synthetic reaction of the novolac type phenol resin. At this time it is necessary that the conversion of an aldehyde is not less than 90 wt % and the water content is not less than 5 wt % water.

If the conversion of an aldehyde is less than 90 wt %, the halogenated ammonium salt acts as a catalyst for novolac reaction, so that the molecular structure of the novolac type phenol resin is changed, thereby making it impossible to produce a high fluidity. If the water content is less than 5 wt %, the halogenated ammonium salt added does not uniformly disperse in the system, and the effect of the addition is reduced.

It is necessary that the molecular structure of a novolac type phenol resin is random novolac or high-para-novolac, and that halogenated ammonium salt is uniformly and finely dispersed in the resin.

The amount of halogenated ammonium salt to be added must be 0.05 to 3 wt % with respect to a resin solid content. If it is less than 0.05 wt %, the quick-curing effect is insufficient, while if it exceeds 3 wt %, the fluidity is lowered, resulting in the lowering of the strength.

A quick curing novolac type phenol resin according to the present invention has a rapid curing rate and a good fluidity. Such a phenol resin is therefore widely applicable as a phenolic resin for industrial use, e.g. a phenolic resin for a shell molding operations and a phenolic resin for binding organic matter or inorganic matter by utilizing the quick curing property and the high strength of the cured resin which is derived form the high fluidity at the time of curing.

The present invention will be explained with reference to the following examples, but it is not restricted thereto. "Part" and "%" in Examples and Comparative Examples represent "part by weight" and "wt %", respectively.

EXAMPLE 1

1,000 parts of phenol and 650 parts of 37% formalin were charged into a reaction vessel equipped with a reflux condenser and a stirrer, and then 10 parts of oxalic acid were added thereto. The temperature was gradually raised, and when it reached 96° C., the mixture was refluxed for 90 minutes. The conversion of formaldehyde in the formula was 95%, and the water content in the system was 32%. 5 parts of ammonium chloride was added to the reaction mixture and they were mixed for 15 minutes. The mixture was thereafter dehydrated under vacuum, and when the temperature of the resin in the vessel reached 170° C., the resin was taken out of the vessel. Thus, 950 parts of a novolac type phenolic resin which was solid at ordinary temperature were obtained.

EXAMPLE 2

1,000 parts of phenol and 700 parts of 37% formalin were charged into a reaction vessel equipped with a reflux condenser and a stirrer, and then 2 parts of 36% hydrochloric acid were added thereto. The temperature was gradually raised, and when it reached 96° C., the mixture was refluxed for 70 minutes. The mixture was dehydrated at normal pressure until the temperature of resin in the vessel reached 108° C. The conversion for formaldehyde in the formalin was 97%, and the water content in the system was 13%. 10 parts of ammonium chloride was added to the reaction mixture and they were mixed for 15 minutes. The mixture was thereafter dehydrated under vacuum, and when the temperature of the resin in the vessel reached 170° C., the resin was taken out of the vessel. Thus, 980 parts of a novolac type phenolic resin which was solid at ordinary temperature were obtained.

COMPARATIVE EXAMPLE 1

1,000 parts of phenol and 650 parts of 37% formalin were charged into a reaction vessel equipped with a reflux condenser and a stirrer, and then 10 parts of oxalic acid were added thereto. The temperature was gradually raised, and when it reached 96° C., the mixture was refluxed for 90 minutes. The mixture was thereafter dehydrated under vacuum, and when the temperature of the resin in the vessel reached 170° C., the resin was taken out of the vessel. Thus, 950 parts of a novolac type phenolic resin which was solid at ordinary temperature were obtained.

COMPARATIVE EXAMPLE 2

1,000 parts of phenol and 650 parts of 37% formalin were charged into a reaction vessel equipped with a reflux condenser and a stirrer, and then 10 parts of oxalic acid were added thereto. The temperature was gradually raised, and when it reached 96° C., the mixture was refluxed for 90 minutes. The mixture was thereafter dehydrated under vacuum, and when the temperature of the resin in the vessel reached 170° C., the conversion for formaldehyde in the formalin was 99%, and the water content in the system was 0.4%. 5 parts of ammonium chloride was added to the reaction mixture and they were mixed for 15 minutes. The reaction mixture was taken out of the vessel. Thus, 955 parts of a novolac type phenolic resin which was solid at ordinary temperature were obtained.

COMPARATIVE EXAMPLE 3

1,000 parts of phenol and 650 parts of 37% formalin were charged into a reaction vessel equipped with a reflux condenser and a stirrer, and then 10 parts of zinc acetate was added thereto. The temperature was gradually raised, and when it reached 90° C., the mixture was refluxed for 240 minutes. The mixture was thereafter dehydrated under vacuum until the temperature of the mixture in the vessel reached 120° C. Then, after refluxed for 120 minutes, the reaction mixture was dehydrated under vacuum, and when the temperature of the resin in the vessel reached 160° C., the reaction mixture was taken out of the vessel. Thus, 830 parts of a novolak type phenol resin which was solid at ordinary temperature was obtained.

A resin coated sand was manufactured by using each of the novolak type phenol resins obtained in Examples 1 and 2 and Comparative Examples 1, 2 and 3.

7,000 parts of reclaimed silica sand No. 6 which had been heated to 130° C. was charged into a whirl mixer and 140 parts of each novolak type phenol resin was added thereto. The mixture was mulled for 40 seconds. 21 parts of hexamethylenetetramine which was dissolved in 105 parts of water was added to the mixture and mulled until the coated sand was disintegrated. Further 7 parts of calcium stearate was added and after 30-second mixing the sand was discharged and aerated to obtain a resin coated sand. The general characteristics of the five resins obtained and the shell mold characteristics of the resin coated sand produced from the respective resins are shown in Table 1.

TABLE 1

| | Example | | Comparative Example | | |
|---|---|---|---|---|---|
| | 1 | 2 | 1 | 2 | 3 |
| General Characteristics | | | | | |
| Gelling Time (hexamine 15% hot plate test 150° C., sec) | 80 | 65 | 120 | 115 | 53 |
| Fluidity (hexamine 15% inclined bench test 125° C., mm.) | 87 | 78 | 94 | 91 | 30 |
| Shell Mold Characteristics | | | | | |
| Cold Bending Strength (kg/cm$^2$) | 52 | 49 | 55 | 53 | 18 |
| Hot Tensile Strength (kg/cm$^2$) 20 sec | 2.1 | 2.5 | 0.8 | 0.9 | 1.2 |
| 40 sec | 4.8 | 4.7 | 3.5 | 3.5 | 2.7 |
| 60 sec | 9.2 | 8.9 | 7.8 | 7.7 | 4.5 |

The resins of the invention have been shown to be effective binders in foundry compositions. They can also be used as binders in other applications, such as friction compositions, e.g. brake linings and binders for batting insulation.

We claim:

1. A quick-curing novolac phenolic resin prepared by reacting a phenol with an aldehyde in the presence of an acidic catalyst until the conversion of the aldehyde is not less than 90 weight percent and the water content is not less than 5 percent, followed by addition of an ammonium halide in an amount of about 0.05 to 3 weight percent of the solid resin.

2. The quick-curing novolac phenolic resin of claim 1 wherein the ammonium halide is selected from ammonium chloride and ammonium bromide.

3. The quick-curing novolac phenolic resin of claim 2 wherein the aldehyde is formaldehyde.

4. The quick-curing novolac phenolic resin of claim 3 wherein the ammonium halide is ammonium chloride.

5. The quick-curing novolac phenolic resin of claim 3 wherein the ammonium halide is ammonium bromide.

6. A method of preparing quick-curing novolac phenolic resin comprising reacting a phenol with an aldehyde in the presence of an acidic catalyst until the conversion of the aldehyde is not less than 90 weight percent and the water content is not less than 5 percent, followed by addition of an ammonium halide in an amount of about 0.05 to 3 weight percent of the solid resin.

7. A method of preparing a quick-curing novolac phenolic resin according to claim 6 wherein the ammonium halide is selected from ammonium chloride and ammonium bromide.

8. A method of preparing a quick-curing novolac phenolic resin of claim 7 wherein the aldehyde is formaldehyde.

9. A method of preparing a quick-curing novolac phenolic resin according to claim 8 wherein the ammonium halide is ammonium chloride.

10. A method of preparing a quick-curing novolac phenolic resin according to claim 8 wherein the ammonium halide is ammonium bromide.

* * * * *